United States Patent [19]

Fisch

[11] Patent Number: 4,599,298
[45] Date of Patent: Jul. 8, 1986

[54] GRAPHIC ARTS IMAGING CONSTRUCTIONS USING VAPOR-DEPOSITED LAYERS

[75] Inventor: Richard S. Fisch, St. Paul, Minn.

[73] Assignee: Minnesota Mining and Manufacturing Company, St. Paul, Minn.

[21] Appl. No.: 631,531

[22] Filed: Jul. 16, 1984

[51] Int. Cl.$^4$ .................. G03C 5/54; G03C 1/72
[52] U.S. Cl. ..................... 430/271; 430/201; 430/346; 430/964; 346/135.1
[58] Field of Search ............... 430/200, 201, 346, 271, 430/964; 346/135.1; 428/457, 469

[56] References Cited

U.S. PATENT DOCUMENTS

| | | | |
|---|---|---|---|
| 3,136,637 | 6/1964 | Larson | 96/75 |
| 3,441,940 | 4/1969 | Salaman et al. | 430/348 |
| 3,671,236 | 6/1972 | Van Beusekom | 96/15 |
| 4,082,902 | 4/1978 | Suzuki et al. | 428/461 |
| 4,212,936 | 7/1980 | Giampieri | 430/503 |
| 4,230,789 | 11/1980 | Fish | 430/159 |
| 4,262,087 | 4/1981 | Quaglia | 430/503 |
| 4,268,541 | 5/1981 | Ikeda et al. | 427/179 |
| 4,271,256 | 6/1981 | Kido et al. | 430/523 |
| 4,307,182 | 12/1981 | Daizell et al. | 430/339 |
| 4,336,323 | 6/1982 | Winslow | 430/339 |
| 4,363,844 | 12/1982 | Lewis et al. | 346/135.1 |
| 4,403,231 | 9/1983 | Ando et al. | 430/346 |
| 4,430,366 | 2/1984 | Crawford et al. | 427/162 |

Primary Examiner—Richard L. Schilling
Attorney, Agent, or Firm—Donald M. Sell; James A. Smith; Lorraine R. Sherman

[57] ABSTRACT

A radiation-sensitive, imageable article comprises in sequence a substrate, a vapor-deposited colorant layer capable of providing an optical density of at least 0.3 to 10 nm band of the electromagnetic spectrum between 280 and 900 nm, and a vapor-deposited graded metal/metal oxide or metal sulfide layer.

8 Claims, No Drawings

GRAPHIC ARTS IMAGING CONSTRUCTIONS USING VAPOR-DEPOSITED LAYERS

FIELD OF THE INVENTION

This invention relates to a radiation-sensitive article comprising a vapor-deposited colorant layer on a substrate with an overlying vapor-deposited, graded metal/metal oxide or metal sulfide layer. In another aspect, the invention relates to a process for providing a color image using the aforementioned radiation-sensitive article. The article is useful in the graphic arts.

BACKGROUND ART

Colorants such as dyes and pigments are used in a wide variety of imaging procedures to provide optical densities for viewable images. Such widely diverse technologies as color photography, diazonium salt coupling, lithographic and relief printing, dye bleach imaging, leuco dye oxidation, sublimation transfer of dyes and photosensitive imaging systems all may use dyes and pigments to form the viewable optical densities. Examples of some of these types of technologies may be found for example in U.S. Pat. Nos. 3,136,637, 3,671,236, 4,307,182, 4,262,087, 4,230,789, 4,212,936, 4,336,323, and the like. In all of these systems the colorant is present in the imageable article within a carrier medium such as a solvent or polymeric binder. In none of these processes does the colorant layer lie below a vapor-deposited metal or graded metal-containing layer. Each of these various imaging technologies has its various benefits and handicaps as measured by their respective complexity.

U.S. Pat. No. 4,271,256 discloses the use of vacuum-deposited organic materials (including dyes) as stripping layers for vapor-deposited metals such as Mg, Mn, Cu, Zn, or Al layers. The preferred metal layer is indium, tin or bismuth and can include an inorganic compound which is a metal sulfide such as $CrS$, $CrS_2$, $Cr_2S_3$, $MoS_2$, $FeS$, $FeS_2$, $CoS$, $NiS$, $Ni_2S$, $Cu_2S$, $Ag_2S$, $ZnS$, $In_2S_3$, $In_2S_2$, $GeS_x$ (x is a positive number 2.5, or less), $SnS$, $SnS_2$, etc.; metal fluorides such as $MgF_2$, $CaF_2$, $RhF_3$, etc.; metal oxides such as $MoO_3$, $InO$, $In_2O$, $In_2O_3$, $GeO$, etc. Also included are halides selected from $AgI$, $AgBr$, $AgCl$, $PbI_2$, $PbBr_3$, $PbCl_2$, $PbF_2$, $SnI_2$, $SnCl_2$, $CuI$, $CuBr$, $CuCl$, $KI$, $KCl$, etc. Such metals as prescribed are imaged by scanning with a laser beam or imaged through a mask by a strobe light and produce strippable images. The images produced by this sytem are weakly adhered to their support (by their very nature they are strippable) and require high energy to produce a visible image.

Vapor-deposited, graded metal/metal oxide or graded metal sulfide layers useful in the present invention are disclosed in U.S. Pat. Nos. 4,364,995 and 4,430,366 which are incorporated herein by reference for the composition of such layers and methods therefor. These layers are constructed of an inorganic matrix containing a dispersed metal (i.e., for the metal/metal oxide layer aluminum particles can be dispersed in an aluminum oxide matrix). As the particle size of the metal increases the color of the layer changes from clear to copper to bronze to black to jet black. By virtue of the technique of application disclosed in U.S. Pat. Nos. 4,364,995 and 4,430,366 this color gradient can be made to occur in the same layer.

SUMMARY OF THE INVENTION

Briefly, the present invention provides a radiation-sensitive, imageable article having at least one vapor-deposited colorant layer on the surface of a substrate and a vapor-deposited, graded metal/metal oxide or metal sulfide layer coated directly over the vapor-deposited colorant layer. The colorant layer or the metal layer may or may not have additional layers present on their surfaces which may consist of vapor-coated organic protective layers. The preferred metal-containing layer is formed on top of the colorant layer, generally by any of the various vapor-depositing techniques known in the art. Prior to subjecting the vapor-deposited colorant and/or metal-containing layer to any physical treatments or stress likely to damage the continuity of the coatings (e.g. rolling, folding, bending, and the like) an organic protective layer may be vapor-deposited onto the surface of the colorant and/or metal.

The present invention provides an article which is a multilayer material comprising in sequence a substrate, a 100 percent solids colorant layer (containing no binders or solvents), and a vapor-deposited, graded metal-containing layer, the article also comprising optional vapor-deposited polymeric layers. The composition of the metal/(metal oxide or sulfide) containing layer may be controlled and even varied over its thickness by regulation of components in a vapor stream in a vapor coating chamber. In the graded metal-containing layer, the boundary region of the metal layer and its overlaid protective layer may have a graded or gradual change from 100% metal-containing to 100% inorganic material. The application of the vapor-deposited colorant layer under the graded metal/metal oxide or metal sulfide layer provides additional useful density over and above the density provided by the graded metal/metal oxide or metal sulfide layer alone as well as providing an opaque layer to mask any defects in the metal layer. The overcoated metal-containing layer provides protection to the colorant layer and limits the abrasion of that layer. The placement of the metal-containing layer above the colorant layer permits the direct imaging of the metal-containing layer without the need for a photosensitive layer. The colorant layer can easily be removed by mechanical (e.g., buffing) or solvent means. All radiation absorbing dyes and pigments are useful in the article of the present invention.

The combination of the vapor-deposited colorant layer on a substrate having a vapor-deposited, graded metal/metal oxide or metal sulfide layer (including layers comprising metal and metal compounds or metal and metal oxides in a dispersed state) coated thereon provides uniquely desirable features. The metal provides high optical densities and the colorant layer masks existing and later-formed defects without any adverse effect on image quality. The substrate may be adjacent to the vapor-deposited colorant layer or it may be adjacent a primer layer optionally having a vapor-deposited organic layer thereon. The vapor-deposited colorant layer contains no binders or solvents and may itself be overcoated by an abrasion resistant, vapor-deposited organic layer. The graded metal-containing layer (disclosed in U.S. Pat. Nos. 4,430,336 and 4,364,995) useful in the present invention preferably contains a greater proportion of metal particles (e.g., metal in metal oxide) in the upper portion of the layer than in the lower portion of the layer which is closest to the colorant layer. Its appearance can vary from black at the upper portion to shiny at the lower portion of the layer (adjacent the substrate), or vice versa in less preferred embodiments. Such a layer is not as soft as a standard aluminum layer and is not as likely to suffer from pinholes or other artifacts induced by robust manufacturing and handling techniques compared to an aluminum layer. Such a layer also masks dirt on the support. It has other distinct advantages over a standard metal layer, used in a color print construction using vapor-deposited colorant and metal layers, which is disclosed in assignee's copending patent application U.S. Ser. No. 631,532, filed July 16, 1984. Because a graded metal-containing layer can have a black color at its upper surface, the article of the present invention can require less energy to image. Such a layer can be made to change from 100 percent aluminum content (neutral (gray), shiny, reflective) to jet black through the layer thickness and can be considered a thermal diode (the temperature gradient, i.e. heat conduction, passes in one direction only) thereby allowing control of heat transfer to the dye layer.

Layers as described in U.S. Pat. Nos. 4,430,336 and 4,364,995 allow for lower energy level imaging or less halation from shiny surfaces during imaging and therfore provide sharper images. Such layers are now shown to be imageable by the ablation of light or heat and are therefore capable of image formation. In such an article illumination and ablation will not sublime the dye under the graded metal-containing layer. In the resulting imaged article, the image adheres strongly to the support.

Use of the graded metal-containing layer provides an easy means of telling the "back" (substrate side) from the "front" of the article because the "front" (photosensitive surface of the full construction) is metal-containing. The graded metal-containing layer provides greater image density than a conventional metal layer and provides an article than can use less metal and requires lower radiation energy and intensity. Protective polymeric vapor-coated layers such as are disclosed in U.S. Pat. Nos. 4,268,541, and 4,363,844 may be employed between the vapor-coated colorant layer and the graded metal-containing layer as well as on top of the graded metal-containing layer. The use of such layers on top of the graded metal-containing layer is a preferred construction in this invention.

As used in the present invention:

"flexible substrate" means a base sufficiently pliable so that it can be bent through an angle of at least 90 degrees without cracking or breaking;

"radiation-sensitive" means sensitive to any form of electromagnetic radiation including heat and electron beam; and "graded metal-containing layer" or "graded metal layer" means a layer containing metal/metal oxide or metal sulfide particles, the ratio of metal/(metal oxide or sulfide) being controlled and even varied over the thickness of the layer.

DETAILED DESCRIPTION

The present invention provides a radiation-sensitive article comprising in sequence:

a substrate, a vapor-deposited colorant layer capable of providing an optical density of at least 0.3, preferably in the range of 0.3 to 5.0 or even up to 7.0, to a 10 nm band of electromagnetic spectrum between 280 and 900 nm, and a vapor-deposited graded metal/metal oxide or metal sulfide layer comprising at least two components (a) metal and (b) metal oxide or metal sulfide or combinations thereof of between 15 Å and $5 \times 10^4$ Å in thickness, said coating being characterized by having a composition which varies its proportions of said at least two components through a thickness of at least 15 Å in a continuous manner, said variation in proportions being further characterized by the ratio of said components only increasing or only decreasing through the thickness of the coating, and most preferably the smaller of the coating layer's (a) metal to (b) metal oxide or metal sulfide or combinations thereof, or (c) metal oxide or metal sulfide or combinations thereof to (d) metal ratios varies by at least 10% over a thickness of at least 15 Å.

The article of the present invention may optionally further comprise a protective organic layer on either or both of the metal-containing layer and/or colorant layer. The protective organic layer may comprise a material having phenoxy groups, alcohol groups, urea groups, ester groups, saccharide, or carbonyl groups (which may be part of carboxyl groups).

The application of a vapor-deposited colorant (dye or pigment) layer to the surface of a substrate, as noted above, provides certain advantages. The metal provides high optical densities and the colorant layer masks existing and later-formed defects in the metal or metalloid layer without any adverse effect on image quality. The substrate may be adjacent the vapor-deposited colorant layer or it may be adjacent an optional primer layer having a vapor-deposited colorant layer thereon. The vapor-deposited colorant layer contains no binders or solvents and may itself be overcoated by an abrasion resistant, vapor-deposited organic layer.

The vapor-deposited colorant (dye or pigment) layer is coated in sufficient thickness so as to provide an optical density of at least 0.3 to a 10 nm band of the electromagnetic spectrum between 280 and 900 nm (preferably between 400 and 700 nm), preferably an optical density of at least 0.6, more preferably at least 0.8 and most preferably at least 1.0 is provided by the colorant. Any dye or pigment from any chemical class which can be vapor-deposited can be used in the practice of the present invention. This includes, but is not limited to, methines, anthraquinones, oxazines, azines, thiazines, cyanines, merocyanines, phthalocyanines, indamines, triarylmethanes, benzylidenes, azos, monoazones, xanthenes, indigoids, oxonols, phenols, naphthols, pyrazolones, etc. The thickness of the layer depends upon the ability of the colorant to provide at least the minimum optical density. The vapor-deposited layer may be as thin as a few nanometers (e.g., three or ten nanometers) and may be as thick as a thousand nanometers. A general range would be three (3) to one thousand (1000) nanometers and a preferred range would be ten (10) to seven hundred (700) nanometers. An even more preferred range would be ten (10) to four hundred (400) nanometers thickness for the dye or pigment. A plurality of dye layers or a mixture of dyes may be used in a single layer. More importantly, the dye should provide a transmission optical density of at least 0.3. Ranges of density from 0.3 to 7.0 and higher are obtainable. Preferably optical densities of at least 0.5 or at least 1.0 should be provided. A range of 1.0 to 5.0 for the maximum optical density at the wavelength of maximum absorbance of the dye is a useful goal, obtainable in the practice of the present invention.

Vapor or vacuum deposition of metals is a well-established practice in the coating art. The present invention as it relates to the vapor-deposited graded metal-containing layer does not require drastic modification of the vacuum deposition processes and apparatus as known in the art except for the means of controlling the introduction of the reactive materials such as oxygen, water vapor, sulphur vapor, or H$_2$S into a metal vapor steam. By controlling the amount and, also importantly, the point at which the reactive vapor or gas is introduced, the proportion of metal to metal oxide or metal sulfide in the layer can be readily controlled. For 100% conversion of the metal to metal oxides or metal sulfides at a given level of the coating, at least a stoichiometric amount of the oxygen or sulfur containing gas or vapor must be introduced to a portion of the metal vapor stream. The presence of measureably larger amounts is undesirable and can cause oxidation of the components of the apparatus.

Substantially any metal capable of forming an oxide or sulfide can be used in the practice of this invention provided it has specifically desired properties (e.g., optical density, light transmissivity, etc.) In particular aluminum, tin, chromium, nickel, titanium, cobalt, zinc, iron, lead, manganese, copper and mixtures thereof can be used. The metal vapors in the chamber may be supplied by any of the various known techniques suitable for the particular metals, e.g., electron beam vaporization, resistance heaters, etc. Reference is made to *Vacuum Deposition of Thin Films,* L. Holland, 1970, Chapman and Hall, London, England with regard to the many available means of providing metal vapors and vapor coating techniques, in general. This prior art is incorporated herein by reference.

Metal-containing layers according to the practice of the present invention may be deposited as thin as layers of molecular dimensions up through dimensions in micrometers. The composition of the layer throughout its thickness may be readily controlled as herein described. Preferably the metal/metal oxide or metal sulfide layer will be between 50 and 5000 Å in its imaging utilities, but may contribute bonding properties when 15 Å, 25 Å or smaller and structural properties when $5 \times 10^4$ Å or higher.

The conversion to graded metal/metal oxide or metal sulfide is, as previously described, effected by the introduction of oxygen, sulfur, water vapor or hydrogen sulfide at points along the metal vapor stream. By thus introducing these gases or vapors at specific points along the vapor stream in the vapor deposition chamber, a coating of a graded composition (throughout the thickness of the layer) may be obtained. By selectively maintaining a gradation of the concentration of these reactive gases or vapors across the length of the vapor deposition chamber through which the substrate to be coated is being moved, an incremental gradation of the composition of the coating layer (throughout its thickness) is obtained because of the different compositions (i.e., different ratios of oxides or sulfides to metals) being deposited in different regions of the vapor deposition chamber. One can in fact deposit a layer comprising up to 100% metal at one surface (the top or bottom of the coating layer, but generally the bottom which is adjacent the dye layer) and up to 100% metal oxide or sulfide at the other surface. This kind of construction is a particularly desirable one because it provides a strong coherent coating layer with excellent adhesion to the substrate. Transitions between compositions having varying proportions of metal oxide or sulfide to metal will occur over a thickness of at least 15 Å and usually at least 20 Å, which for the purposes of the present invention is defined as being a "continuous" variation. This region of transition can of course cover far greater dimensions such as 25, or 50, or 200 Angstroms or the entire thickness of the layer. It is a reasonable characterization of the products of the present invention to describe them as having a transition of at least 10% in the ratio of (metal oxide or sulfide)/metal or metal/(metal oxide or sulfide), whichever is the smallest value, which occurs over at least a 15 Å thickness in the coating. This transition region through the layer is generally uniform over the area which is coated and is not a discontinuous surface phenomenon. The transition in compositions could be reasonably described as being continuous as opposed to present a sharp discontinuous change in the proportions of metal to metal oxides and sulfides in the coating. The preferred materials of the present invention may be described as having this continuous change occur for 50% of the total change in the ratio of the compositions on the upper and lower surfaces over a thickness of at least 30% of the total thickness of the layer.

The thickness of the vapor-deposited metal layer depends upon the particular needs of the final product. In imaging constructions, for example, the thickness generally should be at least about 3 nm. Generally, the layer would be no thicker than 400 nm which would require higher energy to ablate the metal-containing layer during the etching period. A more practical commercial range would be between 10 and 500 nm. A preferred range would be between 20 and 400 nm, a more preferred range would be between 25 and 300 nm, and a most preferred range is 30 and 200 nm.

It is preferred that the majority of the cross-section of the metal layer consist essentially of metal, metal alloys, metal salts and metal compounds. Traces of up to 10% or more of other materials may be tolerated generally in the layer. The metal layer should have fewer than 100, preferably fewer than 50, and more preferably fewer than 30 defects per 177 mm$^2$.

Vapor-deposition of the colorant or metal layers may be accomplished by any means. Thermal evaporation of the metal or colorant, ion plating, radio frequency sputtering, A.C. sputtering, D.C. sputtering and other known processes for deposition may be used in the practice of the present invention. The pressure may vary greatly during coating, but is usually in the range of $10^{-6}$ to $10^{-4}$ torr.

The substrate may be any surface or material onto which colorant may be vapor-deposited. The substrate may be rough or smooth, transparent or opaque, flexible or rigid, and continuous or porous. It may be of natural or synthetic polymeric resin (thermoplastic or thermoset), ceramic, glass, metal, paper, fabric, and the like. For most commercial purposes the substrate is preferably a polymeric resin such as polyester (e.g., poly(ethyleneterephthalate)], cellulose ester, polycarbonate, polyvinyl resin [(e.g., poly(vinylchloride), poly(vinylidene chloride), poly(vinylbutyral), poly(vinylformal)], polyamide, polyimide, polyacrylate (e.g., copolymers and homopolymers of acrylic acid, methacrylic acid, n-butyl acrylate, acrylic anhydride and the like), polyolefin, and the like. The polymer may be transparent, translucent or opaque. It may contain fillers such as carbon black, titania, zinc oxide, dyes, pigments, and of course, those materials generally used in the formation of films such as coating aids, lubricants, antioxidants, ultraviolet radiation absorbers, surfactants, catalysts and the like.

Vapor-deposited layers of metals on substrates suffer from a number of serious limitations in their use as imaging materials. The metal layers tend to be difficult to vapor-deposit without defects (which reduces their ability to faithfully record images) and they are readily subject to the generation of additional defects during handling, transportation and use. In order to avoid such defects, a protective resin layer is generally vapor-deposited on the metal layer.

In the present invention, the organic protective layer may comprise a material with a vapor pressure at 20° C. no greater than that of 1-n-octanol selected from the group consisting of (1) organic materials having carbonyl groups (which may be but are not required to be part of carboxyl groups), (2) phenoxy groups, (3) alcohols or (4) saccharides. The term "organic material" is used because the protective coating does not have to be a single compound or a monomeric compound. In addition to those types of materials, dimers, trimers, oligomers, polymers, copolymers, terpolymers and the like may be used.

The organic materials containing carbonyl groups which are not part of a carboxyl group, for example, include (1) amides, such as phthalamide, salicylamide, urea formaldehyde resins, and methylene-bis-acrylamide, and (2) anilides, such as phthalanilide and salicylanilide. It has been found that these organic materials may be used in layers as thin as 1 nm and provide good abrasion or mar protection. They may be used in thicknesses of up to 600 nm, but without dramatic improvement of results, and in fact often with some diminution of properties. A preferred range would be between 3 and 200 nm, more preferably between 5 and 100 nm, and most preferably at least 5 and lower than 30 or 20 nm.

The organic material containing carbonyl groups include ester group-containing materials such as polyester oligomers, low molecular weight polyester polymers (e.g., polyethyleneterephthalate, polyethyleneisophthalate, etc. having molecular weights between 5,000 and 50,000), diallyl phthalate (and its polymers), diallyl isophthalate (and its polymers), monomethyl phthalate, carboxylic acid alkyl esters, and the like.

The organic material containing phenoxy groups include such materials as Bisphenol A, and low molecular weight phenol formaldehyde resins (e.g., Resinox TM, Monsanto Chemical Corp.). The alcohol containing materials would include 1-n-octanol, dodecanol, benzyl alcohol and the like.

The organic material should be vapor-depositable as this is the general method preferred for application of the protective layer. The organic material may, for example, be deposited in the apparatus and procedures disclosed in U.S. Pat. No. 4,268,541. The partition or baffle described in that apparatus (e.g., Example 1) has not been found to be essential. The two vapor streams (i.e., metal and organic material streams) may be physically spaced apart or directed so that the coating zones for the two materials do not completely overlap. No serious problems has been found even when 50% of each of the coating zones overlap (so that at least 50% of the thickness of the metal layer consists essentially of metal, metal salts, metal compounds, and combinations thereof), although this is not a preferred construction. It is preferred that less than 25% of the total weight of the metal component be in such an overlaping or mixing zone and more preferably less than 10% or even 0% be in such zones. In the practice of the present invention a portion of the metal layer used may be fully oxide, sulfide or metal. At least a region of the coating, usually adjacent to the substrate, may consist of a metal layer without a dispersed phase of inorganic material therein. It is generally preferred that the clear phase of the metal/metal oxide or metal sulfide layer containing discrete particles of metal be at the outer (upper) surface of the layer and the all or a major portion (at least 85 weight percent) of the metal phase be adjacent to the dye layer. However, it may be desirable to position this layer in the reverse manner.

Graded metal/metal oxide or metal sulfide layers, as has been mentioned above, are now shown to be imageable by the ablation of the layer by light or heat and are therefore capable of image formation. Furthermore these layers when used in combination with and overcoated on top of a vapor-deposited dye layer can be made to produce colored images.

The unique vapor-deposited metal-containing layer can be ablated or removed by the action of direct laser imaging or by exposure through a pattern mask (for example a film pattern) to light from a xenon strobe unit. In cases such as these the resultant colored image can appear as a colored image on an opaque dark black background or a black image on a colored background. Surprisingly the colored image can be heat transferred off the imaged support to another layer through an image hole in the metal layer image which then serves as a stencil.

The present invention provides a process for providing a color image, which can be negative or positive acting, from an imageable article as described above comprising a substrate, a vapor-deposited dye or pigment, and a vapor-deposited graded metal/metal oxide or metal sulfide layer, said process comprising:

(a) providing a receptor layer, (b) exposing said metal/metal oxide or metal sulfide layer of said imageable article to an imagewise distribution of radiation which ablates said metal/metal oxide or metal sulfide layer imagewise to provide a metal image in the same mode as the imageable article, (c) bringing said receptor layer and said exposed metal/metal oxide or metal sulfide layer into intimate contact under sufficient pressure and heat and for a sufficient length of time to transfer a dye or pigment image (through a stencil in the metal created by radiation development) to said receptor layer to provide a transfer image in the opposite mode of said imageable article, and (d) removing said receptor layer.

The present invention also provides a process for providing a color image through a metal/metal oxide or metal sulfide background, said method comprising (a) providing an imageable article comprising in sequence a substrate, a vapor-deposited dye or pigment layer, and a vapor-deposited graded metal/metal oxide or metal sulfide layer, (b) exposing said metal/metal oxide or metal sulfide layer of said imageable article to an imagewise distribution of radiation which ablates said metal/metal oxide or metal sulfide layer imagewise to provide a colored image in the opposite mode through a metal background.

Essentially any material may be used as a receptor surface. Paper, polymeric film, ceramics, glass, fibrous sheet, metal and the like may be readily used as a receptor. Those materials, having utility in the art as receptors for sublimed or vapor transferred dyes and pigments would be particularly suitable in the practice of the present invention. Representative receptor layers useful in the present invention include fabrics such as cotton, polyester, polyamide, rayons, wool, and blends thereof, receptor sheets comprising plain paper coated on one surface with a copolymer resin of vinyl acetate and vinyl chloride (Union Carbide VYNS), transparent materials with transparent coatings such as vinylidine chloride, copolymers of vinyl chloride and vinyl acetates, polyesters, and polyamides. Transfer of the dye image is achieved by placing the receptor sheet and imaged article in intimate contact using pressures in the range of 1.0 kg/cm$^2$ to 20 kg/cm$^2$ and temperatures in the range of 50° to 400° C. (but below the scortching temperature of the receptor); preferably a temperature of 150°-200° C. and a pressure of 1.4 kg/cm$^2$ (20 lbs/in$^2$) to 14.0 kg/cm$^2$ (200 lbs/in$^2$) is used which is in the range customarily used to transfer decals to shirts or other receptor sheets. The contact time can be in the range of 3 sec. to about 120 sec., the average time being about 30 sec.

The heating is done approximately uniformly during the dye-transfer operation. By "uniformly" it is meant only that there is not such a difference in the variation of heat applied at one area versus another that it is the amount of heat which determines whether or not dye is transferred. This uniform heating is distinguished from procedures used in laser heated dye sublimation processes.

The processes described above will work whatever the nature of the substrate.

The article of the present invention can be used to make image layers of the types used in color proofing, color overhead projections as well as dye images used as masks for further printing techniques, sequential color amateur printing or viewed as colored information.

Objects and advantages of this invention are further illustrated by the following examples, but the particular materials and amounts thereof recited in these examples, as well as other conditions and details, should not be construed to unduly limit this invention.

EXAMPLE 1

A pigment designated as Monastral Red B TM (DuPont) was placed into a metal molybdenum boat in a vacuum chamber and a paper support designated as polyethylene resin coated paper (a paper construction onto which a high density polyethylene containing dispersed titanium dioxide pigment has been applied on both sides of the paper, Schoeller Paper Company) was positioned 20.3 cm (8 inches) from the pigment source. At a pressure of $10^{-4}$ tor, heat was applied to the pigment source for the time necessary to produce a transmission optical density of 2.0 on the support as measured with a McBeth transmission densitometer. An additional layer was then coated on top of the colorant from an additional crucible. This crucible contained a polyester resin manufactured by Goodyear Corp. under the designation Vitel TM PE 200. Ellipsometric measurements indicated that this layer was 100 microns thick. Using the techniques of Crawford et al. as disclosed in U.S. Pat. No. 4,268,541 an aluminum-/aluminum oxide graded layer was vapor-deposited onto the paper colorant and polyester sandwich. This layer was black in color at its surface and shiny aluminum at the polyester metal interface. Subsequent analysis indicated a coating layer thickness of 200 Å.

The completed imaging material was then exposed to a halftone image in a Xenon Flash Sensitometer for five exposures of a duration of $10^{-3}$ second. A replica of a halftone image on a black background was produced.

EXAMPLE 2

Using the technique of EXAMPLE 1 a vapor coated layer of a blue pigment, phthalocyanine blue,

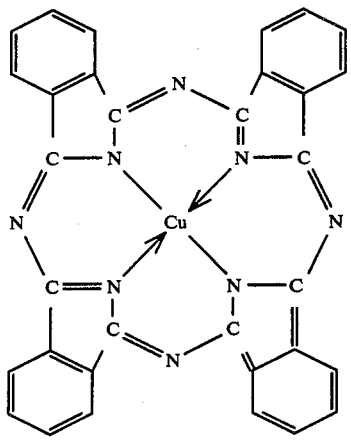

was vapor coated to a transmission optical density of 2.0 on one-half a transparent support 7.6 cm×23 cm (3 in.×9 in.) of 102 micrometer thick (4 mil) polyester. On top of this layer was vapor-coated a metal oxide/metal-containing layer of aluminum using the techniques of Crawford et al. The oxygen addition to the vapor-coated stream was adjusted so that a rapid gradient from shiney aluminum to black aluminum was evident on that section of the support having no dye layer (support side showed shiney aluminum color-top side was black). The transmission optical density of this metal layer was measured at 4.5.

The sample was exposed using a xenon flash sensitometer.

After exposure a blue step tablet image was seen on a black background.

EXAMPLE 3

Using the construction and technique of EXAMPLE 2, a yellow azo dye

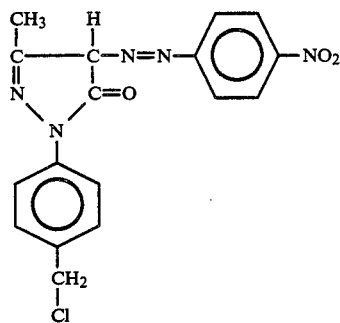

was vapor-coated onto a 102 micrometer thick (4 mil) clear polyester base to an optical density of 1.5. A clear polyester resin layer Vitel TM 220 (Goodyear Chem.) was vapor applied over the layer as a protective coat (thickness 100 nm).

On top of this construction a metal oxide/metal layer (of 4.0 transmission optical density) as desribed in EXAMPLE 2 was vapor-deposited.

This construction was placed in pressure contact to a negative film image of line copy. A Honeywell Model 300 xenon flash unit in contact with the negative film was used to expose the vapor-coated construction. The black metal/metal oxide layer was ablated imagewise. After exposure a yellow line image was seen against a black background.

EXAMPLE 4

Using the techniques of EXAMPLE 1, a 102 micrometer (4 mil) polyester film was vapor-coated with a anthroquinone dye have the structure

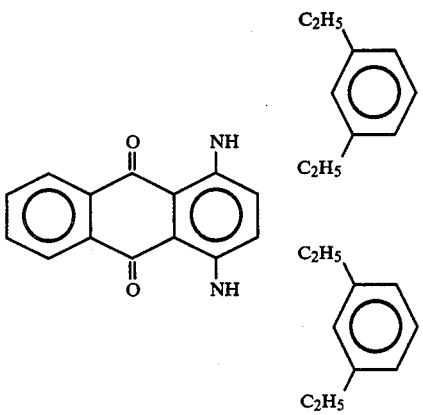

(transmission optical density 2.3) In turn this colorant was vapor-coated with an aluminum/aluminum oxide vapor-deposited layer 200 Å thick.

The resultant imaging construction was addressed using a multiwire electrode writing head of the type described in Digital Microtape Recorder by Agarval in Tippett et al., MIT Press, Cambridge, MA 1965, p. 581 ff.

This head consisted of 49 tungsten wires in a row 0.025 cm (0.01 in.) diameter mounted or "potted" in a straight line in an insulated mold with 0.05 cm (0.02 in.) Microtape Recorder this head (positioned 0.2 cm (0.08 in.) from the imaging film) was addressed by a high voltage discharge of 2 KV corona like discharge.

The corona like discharge serves to generate a source of negative ions. The metallic coating serves as this source. The current pulses generate heat over the energized points and a small spot evaporated from the coating forming a hole in the metal.

On microscopic examination purple blue spots were visible through the imaged holes.

EXAMPLE 5

A polyester base (102 micrometers thick) was vapor coated with XB-6 TM (a black heat transfer dye sold by Crompton and Knowles) and sequentially overcoated with a graded seal aluminum/aluminum oxide layer as described in Example 1 of U.S. Pat. No. 4,430,266 wherein the outer portion of the graded metal layer was black in color and the inner portion (or portion directly on the dye) was shiney aluminum. The transmission optical density of the graded metal-containing layer was 2.15.

This material was placed into contact with a photographically produced and developed silver halide film having alpha-numeric images. The package was exposed using a xenon flash gun of the type used in amateur photography. The flash unit was in contact with the film surface. The graded metal-containing surface was heat ablated away by that exposure revealing an undisturbed dye layer below it. It is believed that the graded metal-containing layer acted as a thermal diode and did not allow disturbance of the vapor-coated dye layer.

This flash exposed sample was then placed in contact with a Color in Color TM (3M) receptor sheet and placed into a heat transfer apparatus in which heat and pressure were applied for 20 sec. at 163° C. and 2.8 kg/cm² (40 lbs.) using a press of the type used in heat transfer printing. A black image was transferred to the receptor sheet. Using the same vapor coated master three more transfers were made.

EXAMPLE 6

A polyester (102 micrometers thick) film base was vapor coated with a layer of black aluminum made by the injection of $O_2$ in the stream during vapor deposition of aluminum (according to U.S. Pat. No. 4,387,156). This layer had an optical density (transmission) of 3.0. In the same vapor coating chamber a vapor coated layer of a Cropton & Knowles blue dye was evaporated to a transmission optical density of 2.5 for the dye alone.

After the dye vapor-coating step, a section of this material was contacted with a Color and Color TM receptor sheet and put into contact with a Honeywell Model 300 xenon flash unit with a metal step attenuator, and exposed for 8 flashes through the polyester base. Six blue colored steps were apparent on the receptor sheet after the exposure.

Another section of the vapor-coated material was placed with its coated layer in contact with the surface of a Color in Color receptor sheet and this sandwich exposed for 1 flash in the xenon flash sensitometer. This time the exposure was through the back of the receptor sheet. Five blue colored steps were apparent on the receptor sheet after the exposure.

EXAMPLE 7

A construction of a polyester base 102 micrometers thick, 200 angstroms of a vapor coated merocyanine dye, 300 angstroms of vapor-coated poly(vinyl butyral) (Butvar TM B-76), and the graded aluminum of Example 1 of U.S. Pat. No. 4,430,366 (to a transmission optical density of 3.5) was prepared. This was exposed by He/Ne laser at an intensity of 0.5 millijoules/cm² to form a halftone image by ablation of the aluminum layer. The construction with the labeled image was developed according to Example 5 and provided image on the receptor sheet.

Various modifications and alterations of this invention will become apparent to those skilled in the art without departing from the scope and spirit of this invention, and it should be understood that this invention is not to be unduly limited to the illustrative embodiments set forth herein.

I claim:

1. A radiation-sensitive, imageable article comprising in sequence:
    a substrate,
    a vapor-deposited colorant layer capable of providing an optical density of at least 0.3 to a 10 nm band of the electromagnetic spectrum between 280 and 900 nm, and
    a vapor-deposited graded metal/metal oxide or metal sulfide layer.

2. The article according to claim 1 wherein said colorant provides an optical density in the range of 0.3 to 7.0.

3. The article according to claim 1 wherein said colorant layer has a thickness in the range of 3 to 1000 nm.

4. The article according to claim 1 wherein said substrate comprises a polymeric film.

5. The article according to claim 1 wherein said metal/metal oxide or metal sulfide layer comprises at least two components of (a) metal and (b) metal oxide or metal sulfide or combinations thereof of between 15 Å and $5 \times 10^4$ Å in thickness, said coating being characterized by having a composition which varies its proportions of said at least two components through a thickness of at least 15 Å in a continuous manner, said variation in proportions being further characterized by the ratio of said components only increasing or only decreasing through the thickness of the coating.

6. The article according to claim 1 wherein the smaller of the coating layer's (a) metal to (b) metal oxide or metal sulfide or combinations thereof, or (c) metal oxide or metal sulfide or combinations thereof to (d) metal ratios varies by at least 10% over a thickness of at least 15 Å.

7. The article according to claim 1 wherein said vapor-deposited graded metal/metal oxide or metal sulfide layer has a thickness of at least 3 nm.

8. The article according to claim 4 further comprising an organic abrasion-protective layer directly over said metal layer.

* * * * *